Aug. 7, 1962 J. L. GLASER 3,048,781

REDUCTION OF QUANTIZING ERROR IN QUANTIZED TRANSMISSION SYSTEMS

Filed Dec. 26, 1957 3 Sheets-Sheet 1

INVENTOR
J. L. GLASER
BY R. B. Ardis
ATTORNEY

Aug. 7, 1962 J. L. GLASER 3,048,781
REDUCTION OF QUANTIZING ERROR IN QUANTIZED TRANSMISSION SYSTEMS
Filed Dec. 26, 1957 3 Sheets-Sheet 2

INVENTOR
J. L. GLASER
BY R. B. Anderson
ATTORNEY

INVENTOR
J. L. GLASER
BY R. B. Ardis
ATTORNEY

United States Patent Office 3,048,781
Patented Aug. 7, 1962

3,048,781
REDUCTION OF QUANTIZING ERROR IN QUANTIZED TRANSMISSION SYSTEMS

John L. Glaser, Madison, N.J., assignor to Bell Telephone Laboratories, Incorporated, New York, N.Y., a corporation of New York Filed Dec. 26, 1957, Ser. No. 705,434
18 Claims. (Cl. 325—41)

This invention relates to pulse transmission systems and more particularly to transmission systems in which the signal to be transmitted is sampled at regularly spaced intervals and the sample values are quantized before or in the course of transmission.

Quantization is a process whereby the exact value of a message wave is approximated by one of a number of discrete values commonly called quantum levels. The process is used, for example, in systems employing pulse code modulation. Such systems usually comprise transmitting and receiving terminals interconnected by a transmission medium.

For many kinds of signals, quantization introduces a defect in the output signal of the transmitting terminal such that the output signal is not an exact replica of the message wave presented to the input of the transmitting terminal. In most applications the message wave may have any of a continuum of values within a finite range of values. Usually, quantized transmission system is arranged to transmit a signal representative of the quantum level which is nearest to the exact value of the message wave presented to the input of the transmitting terminal.

The difference between the exact value of the message wave and the quantum level actually transmitted is called quantizing error and gives rise to what is known variously as quantizing noise or quantizing distortion. In most applications the effect of quantizing error is negligible if the magnitude of the error is sufficiently small. In order to make quantizing error small, quantum levels should be separated by small increments in signal value. If the system is to be made to transmit a predetermined range of signal values, the requirement of small increments between quantum levels leads to the requirement of a large number of quantum levels.

In a pulse code modulation system, the number of quantum levels employed depends on the number of pulses used to represent the value of each signal sample of the message wave and, considering codes other than the binary code, the number of values which each pulse can assume. This fact is well known to those skilled in the art and is discussed, for example, in a paper entitled "The Philosophy of PCM," by B. M. Oliver, J. R. Pierce and C. E. Shannon, which appears in volume 36, pages 1324–1331 of the Proceedings of the Institute of Radio Engineers (1948).

A principal object of this invention is to improve the quality and fidelity of reproduced messages in transmission systems employing quantization.

Another and more specific object of the invention is to reduce the magnitude of quantizing error in quantized transmission systems without increasing the number of pulses used to specify the value of any signal sample, without increasing the number of values which each of the pulses in certain pulse codes must assume, or without decreasing the range of sample values which such systems are capable of transmitting.

Although the present invention has some inherent limitations, which will be discussed in detail below, it is significant to note here that in at least one very important area of communications, namely telephony, these limitations are of no material consequence. For, in applications of which telephony is an example, wherein a system is rearely, if ever, required to transmit successive samples which differ by amounts greater than half of the allowed range of sample values, this invention provides for a more efficient use of the medium over which the encoded information is transmitted.

In accordance with this invention there is provided a method and arrangement for reducing average quantizing error in a quantized transmission system by a factor of substantially two without increasing the number of quantum levels transmitted over a medium connecting the terminal equipment in such a system. In a general sense this reduction in quantizing error is achieved by transmitting quantum levels on the medium at uniform intervals of time so that the average value of any pair of successively transmitted quantum levels approximates as nearly as possible the exact value of the most recent sample of the message wave presented to the transmitted terminal. In the specific embodiments of the invention by which the invention will be explained, the quantum levels are transmitted on the medium by pulse code modulation. In certain other applications not involving pulse code modulation, quantization may be employed in order to permit the use of transmission methods particularly well suited to the transmission of quantized signals. Therefore, although the discussion below is directed to a system employing pulse code modulation, it should be understood that this invention is not limited to such systems.

The invention will be understood more fully from the following detailed description read in conjunction with the accompanying drawings in which.

Figure 1:
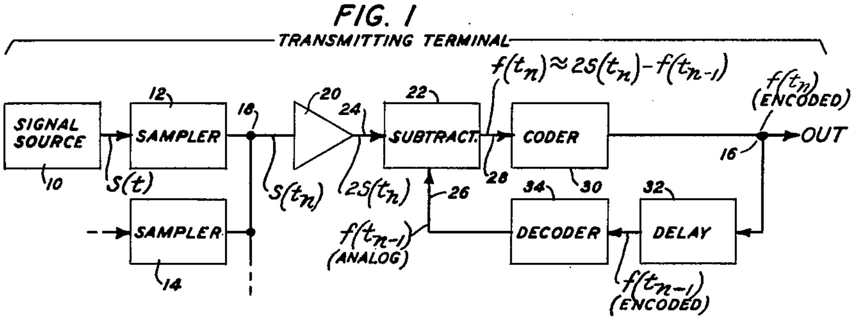
FIG. 1 shows the basic elements of the transmitting terminal of a pulse code modulation transmission system, arranged in accordance with the invention.
Figure 2:
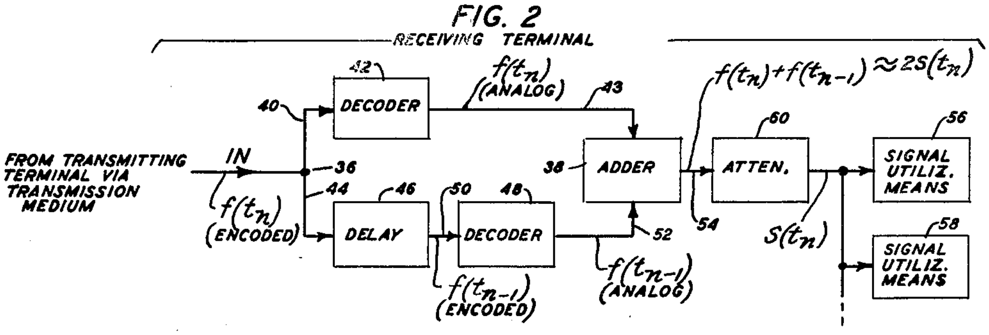
FIG. 2 shows the receiving terminal of such a system.
Figure 4:
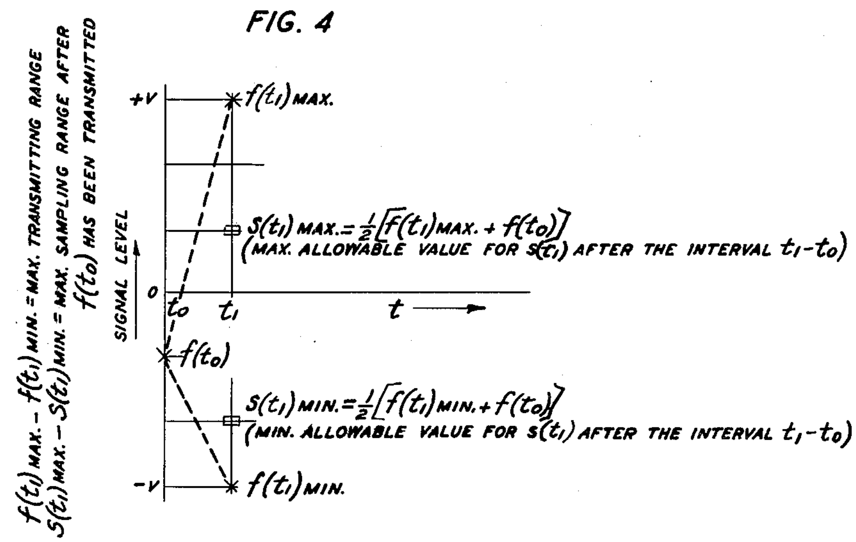
Figure 3A:
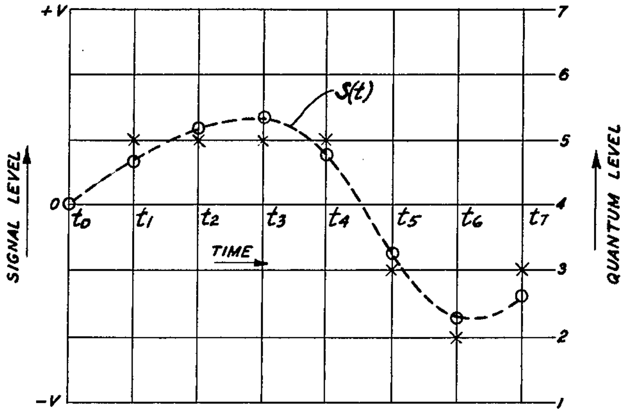
Figure 3B:
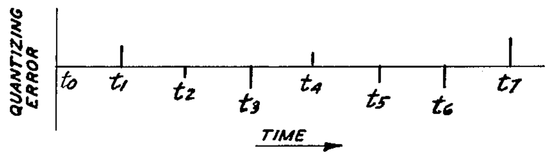
Figure 3C:
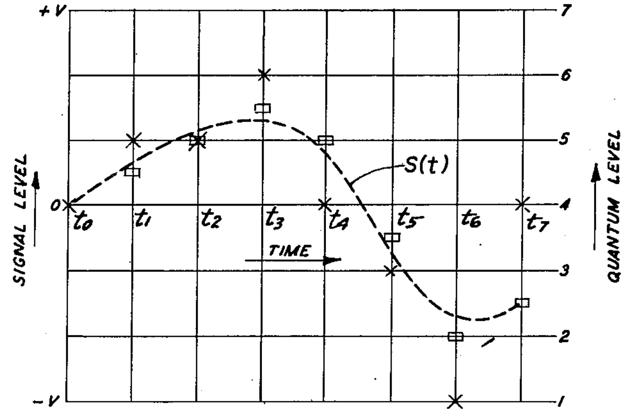
Figure 3D:
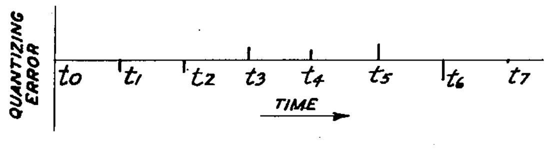
Figure 5:
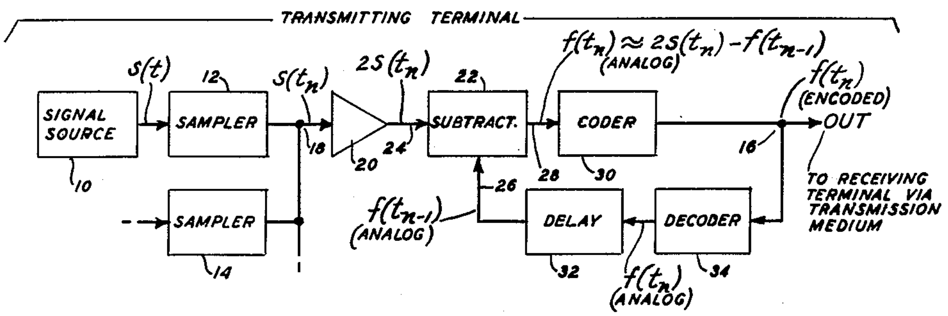
Figure 6:
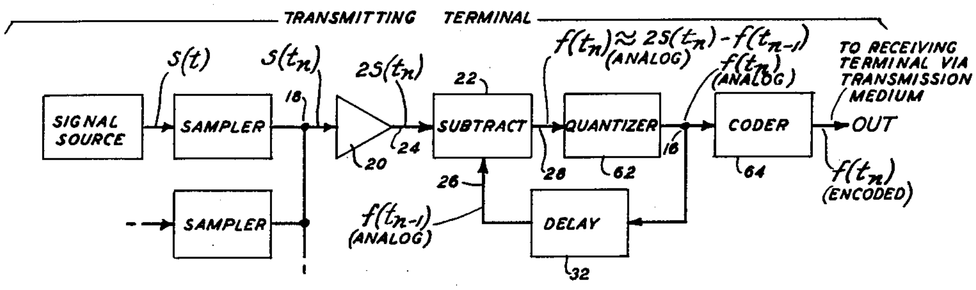
Figure 7:
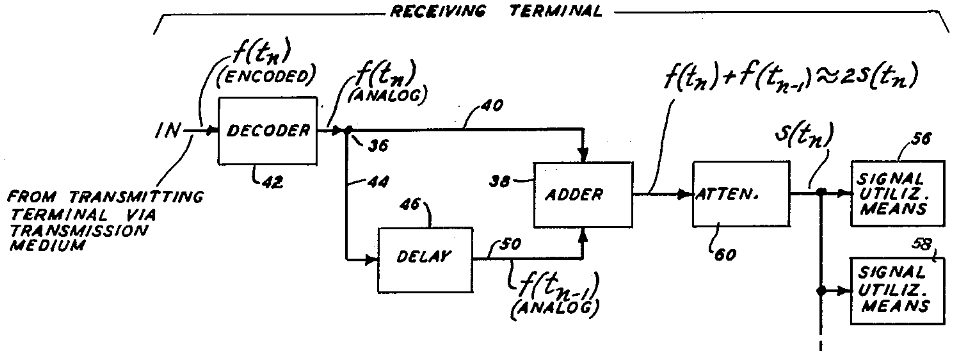

FIG. 3*a* is a plot of signal level versus time and illustrates the process of quantization in a typical quantized system that does not employ the present invention;

FIG. 3*b* shows the quantizing error which accompanies the process illustrated in FIG. 3*a*;

FIG. 3*c* illustrates the novel method by which reduction of quantizing error is accomplished in the illustrative embodiments of the invention;

FIG. 3*d*, when compared with FIG. 3*b*, graphically shows the reduction of average quantizing error in systems employing the invention;

FIG. 4 illustrates graphically an inherent limitation of the present invention;

FIGS. 5 and 6 illustrate alternative arrangements of the transmitting terminal of FIG. 1; and FIG. 7 shows an alternative arrangement of the receiving terminal of FIG. 2.

In order to facilitate and make more clear applicant's contribution to the art, the drawings in the following discussion have been simplified wherever possible. For example, synchronizing circuits are not shown. The manner in which they must be used in a pulse code modulation transmission system is well known to those skilled in the art. Moreover, it should be noted that block diagrams are used throughout the drawings to indicate apparatus for performing specified operations on signals applied thereto. It is believed that these simplifications are justified, since they avoid the myriad collateral details known to be necessary in the operation of a pulse code modulation system and thus avoid clouding the description of the invention. For the essential elements of a typical pulse code modulation transmission system see volume 27 of the Bell System Technical Journal, pages 1–57 (1948).

The essential behavior of systems employing this invention is illustrated in FIG. 3*c*. In order to show the improvement provided by the invention, FIG. 3*a* illustrates the behavior of a typical quantized transmission system (not shown in the drawing) that does not employ the invention.

Note that FIGS. 3*a* and 3*c* are plots of signal level versus time. The dotted line in each of these figures represents the message wave $S(t)$ appearing at the output of signal source 10 in FIG. 1. The discrete quantum levels which can be transmitted on the transmission medium are indicated in FIGS. 3*a* and 3*c*. For purposes of this discussion, only seven discrete quantum levels are shown covering the range of signal values from $-V$ to $+V$. The times $t_n$ (where $n=0, 1, 2, 3$, etc.) at which the signal $S(t)$ is sampled are also indicated.

FIG. 3*a*, as stated above, illustrates the behavior of a typical example of the systems found in the prior art. The exact sampled signal values are plotted as small circles and the quantized values transmitted for each sample are plotted as crosses. The transmission of the quantized values in place of the exact values of the message wave $S(t)$ at the sampling times $t_n$ results in errors in the reproduction of $S(t)$ at the receiving terminal of such a system. The amounts of these errors are plotted in FIG. 3*b*.

FIG. 3*c* illustrates the behavior of a transmission system arranged in accordance with the invention. A system so arranged may comprise, for example, the illustrative embodiments of FIGS. 1 and 2. It will be noted that such a system uses the same number of transmittable quantum levels and has the same range of signal levels as does the ordinary quantized system whose behavior is represented by FIG. 3*a*. In FIG. 3*c*, as in FIG. 3*a*, the quantized values transmitted on the medium are shown by crosses. In accordance with the practice of this invention, these quantized values are derived (in, for example, the illustrative transmitting terminal of FIG. 1) in such a way as to make the average of the quantum level transmitted at any time $t_n$ and the quantum level transmitted at the corresponding time $t_{n-1}$ as nearly as possible equal to the value of $S(t)$ at time $t_n$, i.e., to the sample value $S(t_n)$. Moreover, means are provided, for example, in the illustrative receiving terminal of FIG. 2, for deriving the average value of successive pairs of transmitted values $f(t_n)$ and $f(t_{-n1})$. These average values are indicated by the rectangular plots in FIG. 3*c*. The differences between these average values and the exact values $S(t_n)$ are shown in FIG. 3*d*. This difference constitutes quantizing error.

The advantage afforded by the invention arises from the fact that the average value of two successive quantized values transmitted on the medium can be a value which lies midway between two quantum levels. Consequently, the average magnitude of the quantizing error in a system employing the invention is substantially one-half that in a system not employing the invention.

It will be noted that the transmitting terminal of a quantized transmission system embodying this invention transmits on the transmission medium at any sampling time $t_n$ a quantized value $f(t_n)$ such that $$\frac{f(t_n)+f(t_{n-1})}{2} \approx S(t_n) \qquad (1)$$

In other words, the transmitted quantized value $f(t_n)$ should approximate as closely as possible the value $$2S(t_n)-f(t_{n-1})$$

FIG. 1 will now be described in conjunction with FIG. 3*c*. The message wave $S(t)$, shown as a dotted line in FIG. 3*c*, is an electrical function of time and is supplied by signal source 10 to sampler 12. Sampler 12 samples the message wave $S(t)$ at periodic instants of time $t_n$ (where $n=0, 1, 2, 3$, etc.) and thereby provides at its output the periodic electrical functions of time, i.e., sample values, $S(t_n)$. It will be noted that the intervals $(t_n-t_{n-1})$ are all equal. The sample values $S(t_n)$ are indicated in FIG. 3*e* by the values of the signal $S(t)$ at times $t_0$, $t_1$, $t_2$, etc.

Sampler 14 is shown merely to illustrate the manner in which the invention may be employed in a time-division multiplex system. In such a system a plurality of samplers would be connected in the manner illustrated and the samplers would be actuated in succession. These samplers are advantageously electronic in nature and may, for example, be of the kind described on page 27 of the above-mentioned Bell System Technical Journal Volume. The sample values $S(t_n)$, appearing at the output of sampler 12, are supplied to the input of amplifier 20. Amplifier 20 doubles these sample values so that the values appearing at its output are substantially equal to $2S(t_n)$.

Referring to Equation 1 it is seen that the operational circuits intermediate output terminal 16 and the terminal 18 of FIG. 1 ultimately perform three operations. They derive the functions $2S(t_n)$ and $f(t_{n-1})$, and combine these functions to obtain the functions $f(t_n)$. As stated above, the functions $2S(t_n)$ are derived by amplifier 20. Intermediate the output terminal 16 and the output of amplifier 20 lie the operational circuits which derive the functions $f(t_{n-1})$ and combine these functions with the corresponding functions $2S(t_{n-1})$ in accordance with Equation 1. Subtractor 22 has a pair of input leads 24 and 26 and an output lead 28. A signal appearing at the output lead 28 is in analog form and is the result of the subtraction of any signal applied to input lead 26 from any signal simultaneously applied to input lead 24. The subtractor 22 can take any of various forms. It may, for example, be an amplifier of the kind described in United States Patent No. 2,541,276, which issued on February 13, 1951, to B. M. Oliver, arranged to provide an output whose amplitude is the difference between the amplitudes of two input signals.

Interconnecting the output lead 28 to output terminal 16 is what may be called a feedforward path which includes a coder 30. Coder 30 is of a type well known in the art and combines the processes of quantizing and encoding. For example, the quantizing operation can be integrated with the coding operation if there is employed a coding tube with a quantizing grid of the kind described on page 47 of the above-mentioned Bell System Technical Journal Volume.

A feedback circuit, which includes a delay circuit 32 and a decoder 34, feeds back to the input lead 26 of subtractor 22 any signal appearing at output terminal 16. It can be appreciated that the effect of first quantizing and encoding in coder 30 and then decoding in decoder 34 is to provide a quantized signal at the input lead 26 of subtractor 22. The delay period of delay circuit 32 (and all other delay circuits shown in the drawings) is substantially one sampling interval $(t_n-t_{n-1})$. In the drawings and the discussion thereof, it will be understood that the functions $2S(t_n)$ and $f(t_{n-1})$ are derived from the same signal, namely, the message wave $S(t)$ supplied by signal source 10. Accordingly, bearing in mind the time-division aspects of the illustrative embodiments, it should be understood that the delay period of delay circuit 32 is substantially equal to the period of recurrence of successive samplings from the same one of any one of the signal sources, not to the period of recurrence of the time-multiplexed samplings from all of the signal sources.

The particular arrangement of delay circuit 32 and decoder 34 in FIG. 1 is advantageous where it is desired to store encoded rather than analog information. Other arrangements of the feedback circuit will be described below. Decoder 34 may be, for example, of a type described on page 36 of the above-mentioned volume.

Delay circuit 32 may take any of numerous forms. It may, for example, be an electrical transmission line with a low velocity of propagation; or it may comprise one or more serially-connected multistable circuits with suitable means for inserting digital information therein (information is stored in digital form in delay circuit 32 of FIG. 1) and for extracting the same information therefrom after a predetermined delay period.

It should be emphasized at this point that synchronization is important to the successful operation of any system employing pulse code modulation. If the cumulative loop delay through subtractor 22, coder 30 and decoder 34 is appreciable, the delay period through delay circuit 32 must be modified accordingly, for it is important to synchronize the arrival of signals at the input leads 24 and 26 of subtractor 22. Again, however, in the interests of simplicity, it will be assumed throughout this discussion that each of the elements shown in the drawings functions in a negligibly short interval of time.

The method by which the requirements of Equation 1 are satisfied by the elements of FIG. 1 will now be described with the aid of FIG. 3*c*. In the discussion which follows, the behavior of the elements in FIG. 1 will be considered for times later than time $t_0$ in FIG. 3*c*.

Since delay circuit 32 is arranged to provide at its output at time $t_n$ a replica of any signal supplied to its input at time $t_{n-1}$, the signal value supplied to input lead 26 of subtractor 22 at any time $t_n$ is the value $f(t_{n-1})$. Thus at time $t_1$ the value of the signal supplied to input lead 26 is equal to zero (the value of $S(t)$ at time $t_0$ in FIG. 3*c*). Subtractor 22 takes the value $2S(t_1)$ supplied to its input lead 24, subtracts from this value the zero-valued function $f(t_0)$ supplied to its input lead 26, and yields at its output lead 28 the value $$2S(t_1)-f(t_0)=2S(t_1) \quad (2)$$

The value $2S(t_1)$ is then supplied to coder 30 wherein it is quantized and encoded (the resulting value $f(t_1)$ is indicated by the cross at quantum level 5). It will be noted that the value $2S(t_1)$ is represented in encoded form by the value of quantum level 5, because this quantum level is nearest in value to the value $2S(t_1)$. The pulse code group representative of quantum level 5, i.e., $f(t_1)$, is then transmitted via a transmission medium (not shown) to, for example, a receiving terminal of the type shown in FIG. 2. This pulse code group is also fed back via delay circuit 32 and decoder 34 to the input lead 26 of subtractor 22 where, in its decoded or analog form, it is available for subtraction from the doubled sample value $2S(t_2)$ at time $t_2$.

At time $t_2$ sampler 12 samples the message wave $S(t)$ and derives therefrom the value $S(t_2)$, which value is doubled by amplifier 20 and then supplied to input lead 24 of subtractor 22. At the instant the value $2S(t_2)$ is supplied to input lead 24, the value $f(t_1)$ is supplied to input lead 26. The difference between the values $2S(t_2)$ and $f(t_1)$ is then supplied to coder 30 wherein this difference value is quantized and encoded to yield at output terminal 16 a pulse code group representative of quantum level 5. It will be noted that the value $f(t_2)$ represents the quantum level nearest to the value $$2S(t_2)-f(t_1)$$

Again, this code group is fed back to input lead 26 and also transmitted over a transmission medium (not shown) to a receiving terminal arranged in accordance with this invention. It can be seen, therefore, that the quantized value transmitted at any sampling instant of time (assuming no delay in the operations performed after sampling) is approximately equal to twice the value sampled at that instant less the value of the function transmitted one sampling interval earlier. The process repeats itself, and continuing it through for times $t_3$, $t_4$, $t_5$, $t_6$, and $t_7$, as shown in FIG. 3*c*, results in the transmission of pulse code groups representative of the values indicated by the crosses at those times.

Throughout this discussion reference is made to analog signals and encoded signals. It should be understood, for the purposes of this discussion at least, that a signal is in encoded form when it is represented by a pulse code, and is in analog form when it is proportional to an electrical current or voltage.

FIG. 2 shows an illustrative embodiment of a receiving terminal which may be used in the pulse code modulation transmission system discussed in connection with FIG. 1. The function $f(t_n)$, which appears at the output terminal 16 of FIG. 1, is transmitted via a transmission medium to the input terminal 36 of FIG. 2. Two branches connect input terminal 36 to an adder 38, which, for example, can be an amplifier of the kind described in the B. M. Oliver patent mentioned above, wherein the amplifier is arranged to provide an output whose amplitude is the sum of the amplitudes of two input signals. One branch 40 includes a decoder 42 which supplies the analog signal $f(t_n)$ to input lead 43 of adder 38. Branch 44 includes a delay circuit 46 and a decoder 48. The encoded signal $f(t_n)$ supplied to input terminal 36 is delayed in delay circuit 46 for one sampling interval. Thus, the signal which appears at the output 50 of delay circuit 46 is the encoded signal $f(t_{n-1})$. Decoder 48 supplies the analog signal $f(t_{n-1})$ to input lead 52 of adder 38. It is seen from Equation 1 above that adding the signals $f(t_n)$ and $f(t_{n-1})$ yields a signal at the output 54 of adder 38 substantially equal to twice the value sampled in the transmitting terminal at time $t_n$. It is thus convenient to refer to the output signal of adder 38 as $2S(t_n)$. It should be remembered, however, that the values of the output signal of adder 38 at times $t_n$ differ from the values $2S(t_n)$ by twice the corresponding quantization errors shown in FIG. 3*d*. The signal $2S(t_n)$ is then made available to the signal utilization means 56 and 58 in its original sampled form $S(t_n)$ by attenuator 60, which may, for example, be a simple voltage divider. It should be noted in connection with FIG. 2 (and with FIG. 7) that in many applications the signal utilization means may readily be adapted to utilize the signal $2S(t_n)$, thus eliminating the need for attenuator 60.

It can be seen that the operations just described in connection with FIG. 2 yield at the output of attenuator 60 the values represented by the rectangular plots in FIG. 3*c*.

FIG. 4 shows, by graphical example, an inherent limitation of the invention. As most commonly used, pulse code modulation systems are capable of transmitting a finite number of discrete signal levels. The system designer, in principle at least, is free to assign these discrete signal levels in a manner most advantageous to the kind of signal the system is expected to transmit. Nevertheless, he is ordinarily obliged to limit transmittable signals to a finite range which, in the illustrative diagrams of FIGS. 3*a* and 3*c*, is shown as the range $-V$ to $+V$. Thus, input signals which are less than $-V$ or greater than $+V$ are transmitted as if these input signals were equal to $-V$ or $+V$, respectively. As a result, such a pulse code modulation system is limited in the range of signal values which it can transmit by the amount of quantizing error incurred. This is because positive or negative peaks extending beyond the range $-V$ to $+V$ are clipped.

Systems employing the instant invention suffer this same limitation. In addition, systems employing the invention are limited in the amount by which the average of two successive transmitted values can differ from the earlier of these two transmitted values. It is this limitation which is illustrated by FIG. 4.

In the example shown in FIG. 4, the signal transmitted at time $t_0$ is assumed to have been the value labeled $f(t_0)$. Then the maximum value that the average $$\tfrac{1}{2}[f(t_1)+f(t_0)]$$

can have is $\tfrac{1}{2}[f(t_1)_{max}+f(t_0)]$, where $f(t_1)_{max}$ is the quantized transmitted signal value representing a message wave value of $+V$. Similarly, the minimum value that the average $\tfrac{1}{2}[f(t_1)+f(t_0)]$ can have is $$\tfrac{1}{2}[f(t_1)_{min}+f(t_0)]$$

where $f(t_1)_{min}$ is the quantized transmitted signal value representing a message wave value of $-V$. It will be noted that the maximum and minimum values of the average $\tfrac{1}{2}[f(t_1)+f(t_0)]$ depend on the value $f(t_0)$.

However, for many kinds of signals, including telephony, this limitation is of no material consequence. Telephone signals characteristically are best described statistically. The average power over the frequency spectrum constitutes at least a partial description of the statistical characteristics of speech signals. The fact that the largest frequency components in speech signals occur in the lower portion of the frequency band regarded as necessary for satisfactory telephone transmission (for example below 1000 cps. for a nominal required bandwidth of 4000 cps.), indicates that the diffference between two successive samples will rarely, if ever, be comparable in magnitude to the value V shown in FIG. 4. This characteristic of speech signals has been exploited to advantage in numerous other inventions involving sampled speech transmission. See for example, United States Patent No. 2,605,-361 which issued to C. C. Cutler on July 29, 1952.

FIG. 5 shows an alternative arrangement of the transmitting terminal of FIG. 1 and differs from FIG. 1 only in the arrangement of delay circuit 32 and decoder 34. Note in FIG. 5 that the encoded signal $f(t_n)$ is first fed back through decoder 34, rather than delay circuit 32 as is done in the illustrative embodiment of FIG. 1. The arrangement of FIG. 5 may be advantageous where it is desired to store analog rather than encoded information in delay circuit 32. The relative merits of the embodiments shown in FIGS. 1 and 5 depend in large measure on the state of the art with respect to delay means suitable for delaying digital and analog signals, respectively. The arrangement in FIG. 1 requires the transmission through the delay circuit 32 of more pulses per unit of time than does the arrangement in FIG. 5, but the requirements on intersymbol interference (i.e., interference between successive pulses) and the suppression of noise and echoes are more severe for the arrangement shown in FIG. 5.

FIG. 6 shows another alternative arrangement of the transmitting terminal of FIG. 1. In FIG. 6 the feed-forward circuit which connects the output lead 28 of subtractor 22 to output terminal 16 includes a quantizer 62. Quantizer 62 may be, for example, a quantizing tube of the kind described in United States Patent No. 2,776,371 which issued on January 1, 1957, to A. M. Clogston et al. Such a tube is employed where, as in FIG. 6, it is preferred to quantize without simultaneously encoding. It is seen, therefore, that a decoder is not necessary in the feedback circuit, since the signal $f(t_n)$ is in analog form at terminal 16. Thus, the error reduction process performed by the operational circuits intercoupling terminals 18 and 16 is accomplished without the necessity for coding and decoding. It is only after these circuits have performed their operations that the signal $f(t_n)$ is encoded by coder 64 and transmitted via a transmission medium to an appropriate receiving terminal. Since coder 64 is only required to encode signals appearing at terminal 16, it may be, for example, of the kind described in United States Patent No. 2,449,-467 which issued on September 14, 1948, to W. M. Goodall.

FIG. 7 shows an alternative arrangement of the illustrative embodiment of FIG. 2. In FIG. 7 decoder 42 of FIG. 2 is taken out of branch 40 and connected between a transmission medium (not shown) and input terminal 36. Thus, in FIG. 7, as distinguished from FIG. 2, decoder 42 supplies both of the branches 40 and 44 with the analog signal $f(t_n)$, branch 40 directly connects terminal 36 to adder 38, and decoder 48 of FIG. 2 is dispensed with entirely. In all other respects FIGS. 2 and 7 are identical. The arrangement of FIG. 7 has the advantage, over that of FIG. 2, of savings in equipment (the need for decoder 48 is eliminated). However, as mentioned above in connection with FIG. 5, storing analog signals in a delay circuit (here delay circuit 46) imposes more severe requirements on crosstalk between signals than does storing encoded signals therein (as is done in delay circuit 46 of FIG. 2).

Although the present invention has been discussed with reference to specific embodiments, they should be considered as illustrative, for the invention also comprehends such other embodiments as come within its spirit and scope.

What is claimed is:

1. In a transmission system which employs quantization of periodic amplitude samples of a message wave to translate each of said samples into a permutation code of base *b* represented by groups of pulses occupying recurrent time slots, means for substantially doubling the amplitude of each of said samples, and means for deriving from each of said doubled amplitude samples an amplitude signal having a value substantially equal in magnitude to the magnitude of its parent doubled sample less the magnitude of the immediately preceding derived amplitude signal.

2. A system in accordance with claim 1 wherein said deriving means comprises a subtractor circuit and an output circuit, means interconnecting said subtractor circuit with said output circuit in a feedforward direction, and means interconnecting said output circuit with said subtractor circuit in a feedback direction, said feedback means including delay means to delay said derived amplitude signal by an interval substantially equal to the period of one of said time slots, said subtractor circuit subtracting said immediately preceding derived amplitude signal from said doubled parent sample, said feedforward means feeding forward from said subtractor circuit to said delay means said derived amplitude signal, and said feedback means feeding back from said delay means to said subtractor circuit said immediately preceding derived amplitude signal.

3. A system in accordance with claim 2 wherein said feedforward means comprises quantizing means for quantizing said derived amplitude signals.

4. A system in accordance with claim 2 wherein said feedforward means comprises means for quantizing and encoding said derived amplitude signals and wherein said feedback means further includes means for decoding, said decoding means preceding said delay means in the feedback direction.

5. A system in accordance with claim 2 wherein said feedforward means comprises means for quantizing and encoding said derived amplitude signals and wherein said feedback means further includes means for decoding, said delay means preceding said decoding means in the feedback direction.

6. A pulse code transmitting apparatus for the generation of encoded signals representative of periodic samples of a message wave, said apparatus comprising an amplifier for substantially doubling the amplitude of each of said periodic samples, a subtractor having a pair of inputs and an output, and an output terminal; means for conveying said substantially doubled samples to one of said pair of subtractor inputs, means intercoupling said output of said subtractor and said output terminal, and feedback means intercoupling said output terminal and the other of said pair of subtractor inputs, said feedback means including a delay circuit having a delay period substantially equal to the period of recurrence of said periodic samples.

7. Transmitting apparatus in accordance with claim 6 wherein said means intercoupling said output of said subtractor and said output terminal includes means for quantizing signals conducted therethrough.

8. Transmitting apparatus in accordance with claim 6 wherein said means intercoupling said output of said subtractor and said output terminal comprises quantizing means and encoding means; and wherein said feedback means further includes means for decoding signals conducted therethrough.

9. In a quantized transmission system, means at a transmitter station for sampling a signal to obtain successive signal samples at periodic intervals, means for substantially doubling the value of each of said samples, subtractor means having a pair of inputs and an output for producing a difference signal at said output equal to the difference between signals applied simultaneously to said pair of inputs, means for supplying said substantially doubled signal samples to one of said subtractor inputs, coding means for coding said difference signal into a binary pulse code group representing a particular one of a number of discrete values, means for transmitting said pulse code group to a receiver station, and means for feeding back an analog equivalent of said pulse code group to the other of said subtractor inputs, said feedback means including decoding means and delay means having a delay period equal to one of said periodic sampling intervals.

10. A pulse code receiving apparatus for the reception of encoded signals which have been derived from periodic samples of a message wave, said apparatus comprising an input terminal, an adder having a pair of inputs and an output, means connected to said adder output for producing signals proportional to the amplitude of signals appearing at said adder output, and signal utilization means; said apparatus further comprising a pair of means conductively coupling each of said adder inputs with said input terminal in a feed forward direction, each of said pair of conductively coupling feed forward means including decoding means, and one of said pair of means further including delay means for delaying said encoded signals for an interval of time substantially equal to the period of recurrence of said periodic samples; said means for producing proportional signals intercoupling said adder output and said signal utilization means.

11. A system for the transmission of information derived from periodic amplitude samples of an electrical function of time, comprising a transmitting terminal, a receiving terminal, and a transmission medium interconnecting said terminals; said transmitting terminal comprising means for substantially doubling the magnitude of each of said amplitude samples, means for deriving from each of said doubled amplitude samples an amplitude signal having a value substantially equal in magnitude to the magnitude of its parent doubled amplitude sample less the magnitude of the immediately preceding derived amplitude signal, and means for quantizing and encoding said derived amplitude signals; said encoded signals being conveyed over said transmission medium to said receiving terminal; said receiving terminal comprising means for deriving from said conveyed encoded signals amplitude samples substantially proportional to said amplitude samples of said electrical function of time and means for utilizing said amplitude samples derived from said conveyed encoded signals.

12. A system for the transmission of information derived from periodic amplitude samples of an electrical function of time, comprising a transmitting terminal, a receiving terminal, and a transmission medium interconnecting said terminals; said transmitting terminal comprising means for periodically sampling said electrical function of time to derive said amplitude samples, means for substantially doubling the amplitude of each of said amplitude samples, means for deriving from each of said doubled amplitude samples an amplitude signal having a value substantially equal in magnitude to the magnitude of its parent doubled amplitude sample less the magnitude of the immediately preceding derived amplitude signal, and means for encoding said derived amplitude signals; said transmission medium conveying said encoded signals to said receiving terminal; said receiving terminal comprising feedforward means for translating said conveyed encoded signals into analog signals substantially proportional in magnitude to said doubled amplitude samples, and means for utilizing said last-named signals.

13. A transmission system in accordance with claim 12 wherein said feedforward means at said receiving terminal for translating said conveyed encoded signals into analog signals substantially proportional in magnitude to said doubled amplitude samples comprises first decoding means for translating said encoded signals into first analog signals of substantially the same information content, delay means to delay said conveyed encoded signals by a time interval substantially equal to the sampling period of said sampling means, second decoding means for translating said delayed encoded signals into second analog signals, and adder means for adding said first analog signals and said second analog signals to obtain at said receiving terminal a summation of said first and second analog signals substantially proportional to said doubled amplitude samples manifest at said transmitting terminal.

14. A transmission system in accordance with claim 12 wherein said feedforward means at said receiving terminal for translating said conveyed encoded signals into analog signals substantially proportional in magnitude to said doubled amplitude samples comprises decoding means for translating said conveyed encoded signals into analog signals of substantially the same information content, delay means to delay said analog signals by a time interval substantially equal to the sampling period of said sampling means, and adder means for adding said analog signals, directly derived from said conveyed encoded signals, to said delayed analog signals to obtain at said receiving terminal analog signals substantially proportional to said doubled amplitude samples manifest at said transmitting terminal.

15. In a quantized wave transmission system for the transmission of information representative of a continuously varying wave, means for deriving samples of said wave at regularly recurrent intervals, a subtractor having first and second inputs and an output from which is derived a signal equal to the difference of the quantities applied to said first and second inputs, means for applying said wave samples to the said first input of said subtractor, means for quantizing the output of said subtractor to $n$ discrete levels to translate said subtractor output to quantized signals, means for applying said quantized signals to a transmission medium, a feedback path providing a delay equal to the interval between successive wave samples for also applying said quantized signals to said second input of said subtractor, and means for establishing a ratio between the amplitudes of the samples applied to said first subtractor input and the quantized signals applied to said second subtractor input at substantially two to one for consecutive samples of equal amplitudes.

16. The combination in accordance with claim 15 and receiver means for deriving from each pair of successive signals received from said transmission medium a signal wave substantially proportional to the average of said each pair.

17. In a transmission system that converts samples of an analog wave into a pulse code, the combination of means for sampling said wave at periodic intervals; amplifier means for substantially doubling the amplitude of each of said samples; means, including subtractor means and means for quantizing each remainder signal produced by said subtractor means, for subtracting from each amplified sample the quantized remainder signal next preceding said amplified sample in point of time; and means for encoding said quantized remainder signals.

18. A quantized wave transmission system for effectively doubling the number of quantum levels recognized by said system, comprising: a wave source, means for sampling said wave at periodic intervals, amplifier means for substantially doubling the amplitude of each sample of said wave, means for periodically subtracting from each said amplified sample the next preceding remainder signal produced by said subtracting means, means for quantizing each said remainder signal before subtraction from the next following amplified sample, means for transmitting said quantized remainder signals, and receiver means for deriving from each pair of successive remainder signals a signal substantially proportional to the average of said each pair.

References Cited in the file of this patent

UNITED STATES PATENTS

| | | |
|---|---|---|
| 2,516,587 | Peterson | July 25, 1950 |
| 2,605,361 | Cutler | July 29, 1952 |
| 2,657,253 | Bedford | Oct. 27, 1953 |
| 2,732,424 | Oliver | Jan. 24, 1956 |
| 2,759,998 | Labin et al. | Aug. 21, 1956 |
| 2,784,256 | Cherry | Mar. 5, 1957 |
| 2,850,574 | Kretzmer | Sept. 2, 1958 |